US006360163B1

(12) United States Patent
Cho et al.

(10) Patent No.: US 6,360,163 B1
(45) Date of Patent: Mar. 19, 2002

(54) VEHICLE DETECTOR USING A LOOP SENSOR

(75) Inventors: Dong-il Cho; Sung-Wook Kim; Hyungjin Kim, all of Seoul; Jae-in Ko, Kyungki-do, all of (KR)

(73) Assignee: Dong-il CHO, Seoul (KR)

( * ) Notice: Subject to any disclaimer, the term of this patent is extended or adjusted under 35 U.S.C. 154(b) by 0 days.

(21) Appl. No.: 09/489,545

(22) Filed: Jan. 21, 2000

(30) Foreign Application Priority Data

Jan. 22, 1999 (KR) .......................................... 1999-1856

(51) Int. Cl.[7] .......................... G06F 19/00; G06G 7/70; G06G 7/76

(52) U.S. Cl. ........................ 701/118; 701/47; 327/156; 340/825.71

(58) Field of Search ................................ 701/1, 42, 46, 701/47, 118; 331/17, 25, 65; 327/46, 47, 48, 156, 159, 160; 340/825.7, 825.71; 180/167

(56) References Cited

U.S. PATENT DOCUMENTS

| | | | | | |
|---|---|---|---|---|---|
| 5,969,576 | A | * | 10/1999 | Trodden | 331/1 A |
| 6,005,425 | A | * | 12/1999 | Cho | 327/156 |
| 6,091,304 | A | * | 7/2000 | Harrer | 331/10 |
| 6,111,442 | A | * | 8/2000 | Aulet et al. | 327/156 |

* cited by examiner

*Primary Examiner*—Gertrude Arthur
(74) *Attorney, Agent, or Firm*—Perman & Green, LLP

(57) ABSTRACT

A vehicle detector comprising a loop sensor, phase lock loop (PLL), frequency change detector, and a micro-processor including a logic circuit. Output of the PLL and the frequency change detector is inputted to the logic circuit, and the logic circuit performs logical OR operation of the output of the PLL and the output of the frequency change detector. The output of the logic circuit is used as a vehicle detection signal. The vehicle detector can detect vehicles at a low speed as well as vehicle at high speed accurately.

6 Claims, 5 Drawing Sheets

PRIOR ART

VEHICLE DETECTOR USING A LOOP SENSOR

BACKGROUND OF THE INVENTION

1. Field of the Invention

The present invention relates to vehicle detectors using loop sensors, and in particular relates to a vehicle detector using a loop sensor which includes a frequency change detector for detecting vehicles at low speeds.

2. Description of Related Art

Below described first are vehicle detectors using loop sensors of prior art.

FIG. 1 is a diagram of a vehicle detector using a loop sensor of prior art.

A vehicle detector using a loop sensor illustrated in FIG. 1 detects a vehicle's passing, from changes in the resonant frequency caused by changes in the loop inductance which occur when a conductor passes over the loop (11). In order to detect changes in the resonant frequency and to output vehicle detection signals, such vehicle detector uses a PLL (12) and a detection circuit (13). PLL's operation is explained below.

FIG. 2 is a block diagram of a PLL. PLL (Phase-Locked Loop) is an oscillator which can trace input signals through a closed loop control, in order to prevent phase differences between outputs from an oscillator and input signals. Outputs of the oscillator thus are synchronized to input signals. The PLL consists of a phase detector (21), a low-frequency pass filter (22), and a voltage control oscillator (24). First, the phase detector (21) compares phases of two input signals and generates a voltage proportional to the phase difference between the two signals, which is outputted as a voltage representing the difference between two frequencies after going through the low frequency pass filter (22) and the amplifier (23).

The voltage control oscillator (24) generates output frequencies based on the voltage input generated above, and such operations are repeated until there is no frequency difference between the output frequencies and the input signals.

When a loop sensor is connected to the input and output ports of a PLL and the normal state of no vehicle passage is maintained, input and output frequencies are synchronized to ω FR, and V1, V2, and V3 all have value '0.' At this state, if a vehicle passes through the sensor and thus there is a sudden increase in the input frequency ω i, an output voltage V3 is generated, and ω 0 increases according to the characteristic of the voltage control oscillator (24). The loop goes into an equilibrium state with such increased frequency. On the other hand, if the input frequency decreases, V3 is changed to be a negative value and ω 0 decreases according to the characteristic of the voltage control oscillator (24). The PLL again goes into an equilibrium state with such decreased frequency, and thus goes into a phase-locked state.

Vehicle detectors using such loop sensors of prior art may recognize a vehicle of a low speed to be a number of different vehicles. A vehicle at a low speed may change its speed while it is within the range of a loop sensor, by repeating acceleration and deceleration after its entry into and before exit from the loop sensor. Such a vehicle passing over a loop sensor at a low speed may cause the loop sensor to output signals which look same to signals generated by a number of vehicles passing at high speeds, and thus may impair accurate detection. FIG. 3 illustrates an example of such an error of recognizing a vehicle of a low speed which repeats accelerating and deceleration while on the loop sensor, to be a number of different vehicles.

If a vehicle enters a loop sensor, it is detected through the change in frequencies caused by such an entry of a vehicle. For a vehicle of a low speed, if the vehicle decelerates its speed even a little bit before exiting the loop, the operation of the re-equilibrated loop is stopped and one vehicle passage is detected. After this, if the vehicle accelerates again, another detection is made for such change. Detection for such changes in speed can be made until the vehicle makes complete exit from the loop. In the example of FIG. 3, a low-speed vehicle was detected to be three vehicles.

Because vehicle detectors can be useful especially in adverse traffic conditions, such as a bumper-to-bumper condition, it is essential to solve the above problems which can arise when a vehicle of a low speed passes over a it loop sensor.

SUMMARY OF THE INVENTION

It is an object of the present invention to provide vehicle detectors using loop sensors which can accurately detect vehicles passing over loop sensors at low speeds, in order to solve the above problems presented by prior art.

In accord with the above object, a vehicle detector using a loop sensor by the present invention comprises a loop sensor having different resonant frequencies according to changes in the loop's inductance caused by passing vehicles, a PPL for outputting vehicle detection signals upon detecting changes in resonant frequency of the said loop sensor, a frequency change detector connected parallel to the said PLL, a logic circuit whose outputs are generated using the signals from the said PLL and the said frequency change detector, and a micro-processor which determines the vehicle detection based on outputs from the said PLL and the said frequency change detector.

In a vehicle detector using a loop sensor of the present invention, the said frequency change detector can be implemented with a frequency/voltage converter.

If a frequency change detector of a vehicle detector using a loop sensor by the present invention is implemented with a frequency/voltage converter, vehicle detection signals to be used are outputs from logical OR operations or other logical ones of the said PLL's outputs and frequency/voltage converter's outputs.

In a vehicle detector using a loop sensor of the present invention, the said frequency change detector can be implemented with a frequency counter.

If a frequency change detector in a vehicle detector using a loop sensor of the present invention is implemented with a frequency counter, PLL's signals are made to be external interrupt signals to the micro-processor, in order to enable the micro-processor to examine outputs from the frequency counter only when there is a response from the PLL.

BRIEF DESCRIPTION OF THE ATTACHED DRAWINGS

DETAILED DESCRIPTION OF PREFERRED EMBODIMENT

Detailed description of a vehicle detector using a loop sensor of the present invention is provided below with references to the drawings attached hereto.

Figure 1:
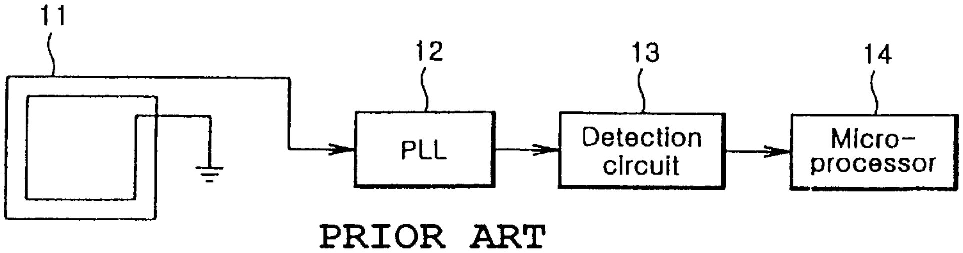
FIG. 1 is a structure diagram of a vehicle detector using a loop sensor of prior art.
Figure 2:
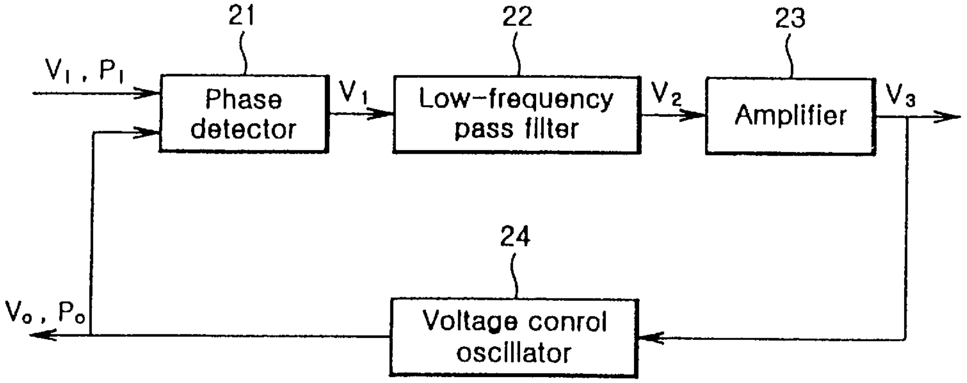
PRIOR ART Fig.2
FIG. 2 is a block diagram of a PLL.
Figure 3:
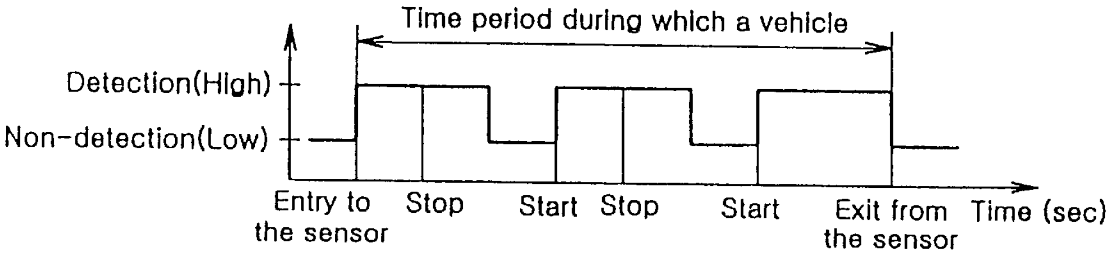
FIG. 3 is a drawing illustrating an example of a vehicle of a low speed being recognized as a few different vehicles due to its repeated acceleration and deceleration while it is passing over a loop sensor.
Figure 4:
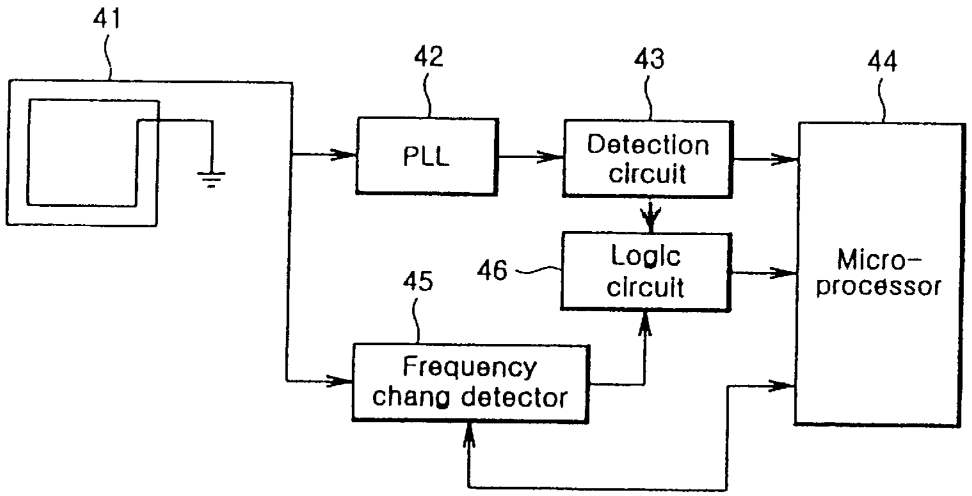
PRIOR ART Fig.4
FIG. 4 is a diagram of a vehicle detector using a loop sensor of the present invention.

FIG. 4 is a diagram of a vehicle detector using a loop sensor of the present invention.

As illustrated in FIG. 4, a vehicle detector using a loop sensor of the present invention introduces a frequency change detector(45) into a vehicle detector using a loop sensor of prior art. A frequency change detector(45) is connected parallel to a PLL(42) and a detection circuit(43) for detecting vehicles passing the loop sensor at low speeds. Outputs of a detector circuit(43) and a frequency change detector(45) are connected to a logic circuit(46). A logic circuit(46) can be implemented as a logical OR operation or the other logical ones. A microprocessor controls the operation of the said frequency change detector(45) using enables signals. A frequency change detector can be implemented with a frequency/voltage converter or with a frequency counter.

First, an embodiment example using a frequency/voltage converter for a frequency change detector is explained.

Figure 5:
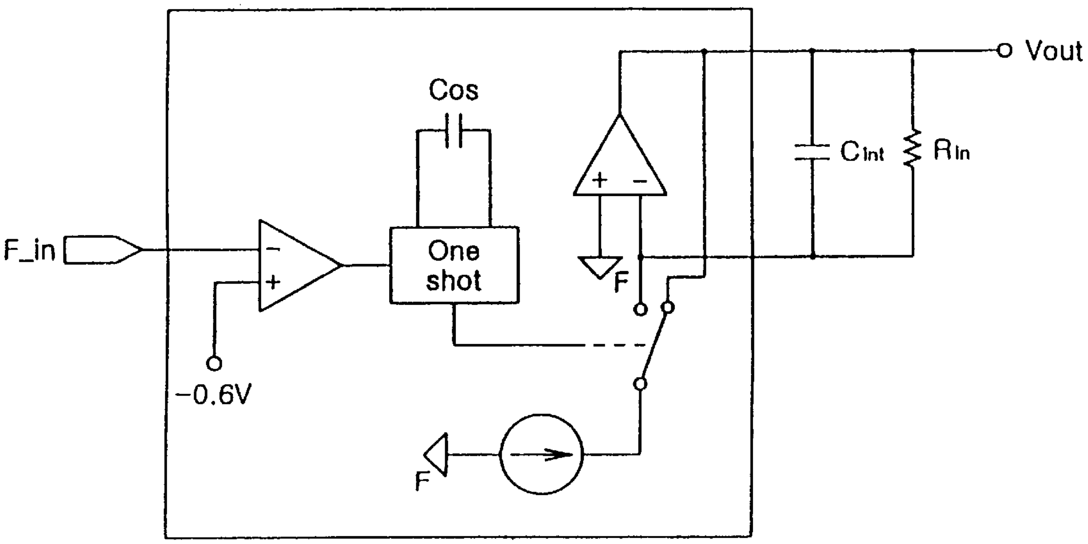
FIG. 5 is a circuit diagram for internal operation of a frequency/voltage converter.

FIG. 5 is a circuit diagram for internal operations of a frequency/voltage converter. A frequency/voltage converter is a reverse implementation of operations of the general voltage frequency converter. If input pulses are applied, one switch mode conversion is made for every one pulse by the one shot chip. If a switch is connected to the input port of an operation amplifier as illustrated in FIG. 5, a current of 1 mA from an independent current source flows from the input port to the output port of the operation amplifier, and the voltage at the output port is determined by the resistance connected to such current. Thus, the higher the frequency of input pulses is, the larger the number of activation of the one shot chip becomes. The current is supplied to the integral capacitor only when the one shot chip is activated, and therefore, the current flowing into the integral capacity in a time unit is proportional to the frequency of input pulses.

Figure 6:
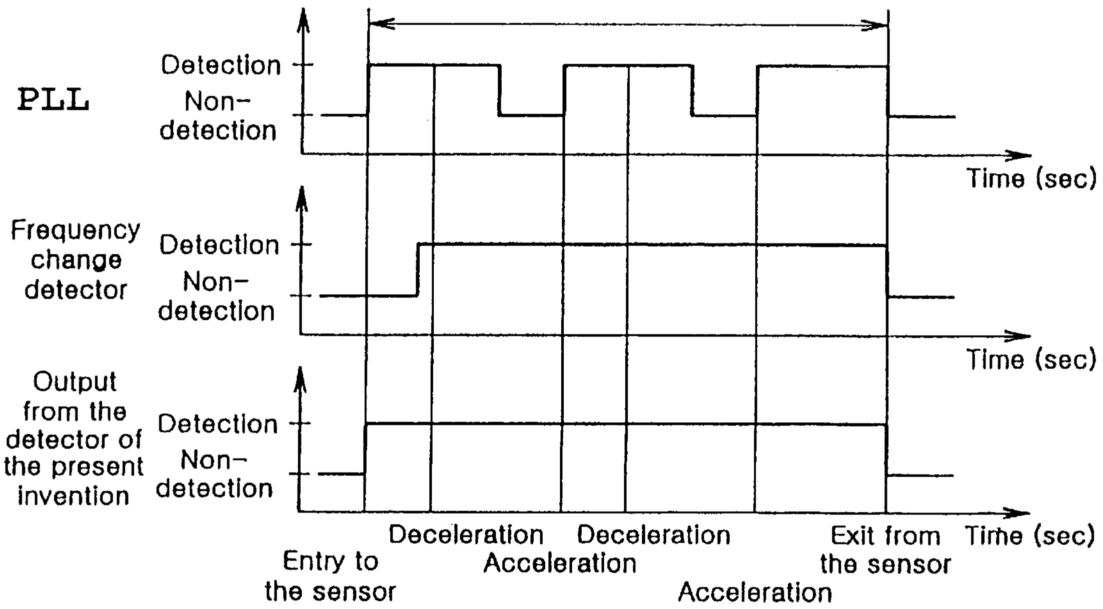
FIG. 6 is a representation of vehicle detection results by the PLL and by the frequency change detector, and of a result from the logical operation of the above two detection results, for a vehicle passing over a loop sensor at a low speed.

FIG. 6 is a diagram illustrating vehicle detection results by a PLL and a frequency change detector for a vehicle passing over a loop sensor at a low speed. As described in FIG. 6, the vehicle detection by a frequency change detector responds more slowly to a vehicle's entry than the vehicle detection by a PLL. However, the detection by a frequency change detector has a strength of not making extra detection for a low-speed vehicle's acceleration or deceleration while passing over the loop sensor. Therefore, it is desirable to use a PLL for vehicles passing at high speeds and a frequency change detector for vehicles passing at low speeds. At the bottom of FIG. 6, the result from OR operations of the PLL's outputs and the frequency change detector's outputs is represented. By using OR operations of the PLL's outputs and the frequency change detector's outputs, the present invention can make use of the PLL's outputs for a high-speed vehicle passing over the loop sensor before the frequency change detector can respond, and it can make use of the frequency change detector's outputs for a low speed vehicle. Consequently, accurate detection for either high-speed vehicles or low-speed vehicles can be made according to the present invention.

In a vehicle detector using a loop sensor of the present invention, a frequency counter can be used as a frequency change detector.

Figure 7:
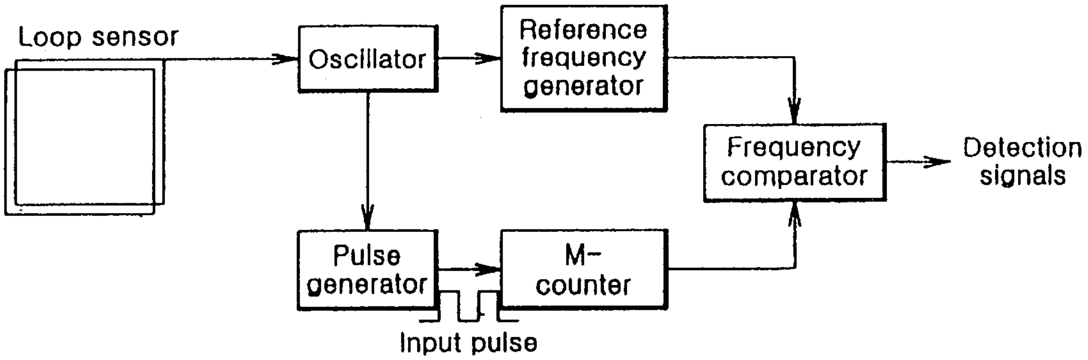
FIG. 7 is a drawing illustrating the operation of a frequency change detector.

FIG. 7 is a diagram to illustrate the operations of such frequency counter.

A frequency counter outputs the number of pulses inputted during a time unit. For example, if 100 pulses are inputted in 1 ms, a frequency counter outputs the result of 100 kHz. Because a frequency counter can be implemented by combination of logic circuits, using a frequency counter has a strength of making it possible to minimize and integrate the circuit, compared with a vehicle detector using a frequency/voltage converter.

In order to count the number of pulses, a clock with a frequency at least twice higher than that of input pulses should be provided for a frequency counter. Because frequencies of signals generated in loop sensors are approximately 100 kHz, a frequency counter with a frequency of a few MHz is sufficient for accurate counting of the number of pulses. The output from a frequency counter is the number of pulses in a time unit which ultimately means the frequency of the inputted signals, and such frequency result is represented in 8 bits or 16 bits in order to be transmitted to the micro-processor. The micro-processor can detect changes in frequencies from the outputs from the frequency counter.

In order to relieve the micro-processor of the burden of examining the outputs from the frequency change detector all the time and to increase the accuracy of the vehicle detection, the present invention uses a PLL together with a frequency change detector. Because the PLL responds more rapidly to a vehicle entering the loop sensor than the frequency change detector, it is desirable to have the micro-processor examine outputs from the frequency change detector periodically or to have the frequency change detector perform its operations, only after the PLL makes such a response to a vehicle's passage. For this purpose, signals from the PLL are used as external interrupt signals for the micro-processor or as enable signals for the frequency change detector.

As explained above, a vehicle detector using a loop sensor of the present invention, by using output signals from a PLL connected parallel to a frequency change detector and output signals from such frequency change detector, makes it possible to accurately detect vehicles passing over the loop sensor at both high speeds and low speeds.

We claim:

1. A vehicle detector comprising:

(a) a loop sensor having inductance, and resonant frequencies which change according to changes in the inductance of the loop caused by passing vehicles;

(b) a PLL connected to said loop sensor which outputs vehicle detection signals upon detecting changes in the resonant frequencies of said loop sensor;

(c) a frequency change detector which is connected to said loop sensor in parallel to said PLL;

(d) a micro-processor which includes a logic circuit whose output is generated using signals from said PLL and said frequency change detector and which determines the vehicle detection based on the output of said logic circuit.

2. A vehicle detector according to claim 1, wherein said frequency change detector is implemented with a frequency/voltage converter having an output signal.

3. A vehicle detector according to claim 2, wherein: the output of said logic circuit is a logical OR operation of the output of said PLL and the output signal of said frequency/voltage converter.

4. A vehicle detector according to claim 1, wherein: said frequency change detector is implemented with a frequency counter having an output signal.

5. A vehicle detector according to claim 4, wherein:

the output of said logic circuit is logical OR operation of the output of said PLL and the output signal of said frequency counter.

6. A vehicle detector according to claim 1, wherein: said signal of said PLL is used as an external interrupt signal for the micro-processor or as enable-signal for said frequency change detector, in order for said microprocessor to examiner signals from said frequency change detector only after response of said PLL is received.

* * * * *